(12) United States Patent
Mahama et al.

(10) Patent No.: US 7,667,787 B2
(45) Date of Patent: Feb. 23, 2010

(54) BACKLIGHT DEVICE AND TRANSMISSION TYPE LIQUID CRYSTAL DISPLAY APPARATUS

(75) Inventors: Kazutoshi Mahama, Ibaraki (JP); Masato Hatanaka, Saitama (JP)

(73) Assignee: Sony Corporation, Tokyo (JP)

( * ) Notice: Subject to any disclaimer, the term of this patent is extended or adjusted under 35 U.S.C. 154(b) by 90 days.

(21) Appl. No.: 10/575,792

(22) PCT Filed: Aug. 5, 2005

(86) PCT No.: PCT/JP2005/014441
§ 371 (c)(1),
(2), (4) Date: Apr. 14, 2006

(87) PCT Pub. No.: WO2006/018996
PCT Pub. Date: Feb. 23, 2006

(65) Prior Publication Data
US 2008/0284942 A1 Nov. 20, 2008

(30) Foreign Application Priority Data
Aug. 18, 2004 (JP) ............................. 2004-238786

(51) Int. Cl.
*G02F 1/1335* (2006.01)
(52) U.S. Cl. .......................... 349/64; 349/67
(58) Field of Classification Search ............. 349/61, 349/62, 63, 64, 65
See application file for complete search history.

(56) References Cited

U.S. PATENT DOCUMENTS

| | | | |
|---|---|---|---|
| 5,093,765 A * | 3/1992 | Kashima et al. ............ | 362/622 |
| 5,477,422 A * | 12/1995 | Hooker et al. ............. | 362/29 |
| 6,566,689 B2 | 5/2003 | Hoelen et al. | |
| 6,909,234 B2 | 6/2005 | Chen | |
| 2003/0086030 A1 * | 5/2003 | Taniguchi et al. .......... | 349/61 |
| 2004/0223313 A1 * | 11/2004 | Yu et al. ..................... | 362/31 |
| 2005/0007516 A1 * | 1/2005 | Hong et al. ................. | 349/64 |

(Continued)

FOREIGN PATENT DOCUMENTS

EP 1496488 A1 1/2005

(Continued)

*Primary Examiner*—David Nelms
*Assistant Examiner*—David Y Chung
(74) *Attorney, Agent, or Firm*—Wolf, Greenfield & Sacks, P.C.

(57) ABSTRACT

The present invention is directed to a transmission type liquid crystal display apparatus using a backlight device for delivering rays of display light which have been emitted from a large number of light emitting diodes to a transmission type display panel, wherein an optical sheet block (10) is provided between a liquid crystal panel (5) and a light source unit (7) including a large number of LEDs (12), the transmission type liquid crystal display apparatus comprising a light diffusion plate (15), consisting of resin, having light transmitting characteristic, which is adapted control incidence of rays of display light which have been emitted from the respective LEDs (12). At the light diffusion plate (15), light adjustment patterns (18) facing the respective LEDs (12) and adapted to take a shape which has dimensions including outer shape thereof and is longitudinally elongated are formed by light reflection ink. Thus, realization of uniformity of rays of light which have been emitted from LEDs (12) is preformed to realize image display of high luminance in which color unevenness and/or lateral stripe have been suppressed.

9 Claims, 8 Drawing Sheets

U.S. PATENT DOCUMENTS

| | | |
|---|---|---|
| 2008/0024696 A1 | 1/2008 | Arai et al. |
| 2008/0055928 A1 | 3/2008 | Arai |
| 2008/0285268 A1 | 11/2008 | Oku et al. |

FOREIGN PATENT DOCUMENTS

| | | |
|---|---|---|
| GB | 2393845 A | 4/2004 |
| JP | 63-10103 A | 1/1988 |
| JP | 3-208087 A | 9/1991 |
| JP | 6-301034 A | 10/1994 |
| JP | 09-145934 A | 6/1997 |
| JP | 11-212479 A | 8/1999 |
| JP | 2001-222242 A | 8/2001 |
| JP | 2002-109936 A | 4/2002 |
| JP | 2004-6317 A | 1/2004 |
| JP | 2004-520695 A | 1/2004 |
| JP | 2004-193049 A | 7/2004 |
| JP | 2004-287226 A | 10/2004 |
| JP | 2004-311353 A | 11/2004 |
| JP | 2005-044756 A | 2/2005 |
| JP | 2005-117023 A | 4/2005 |
| JP | 2005-148731 A | 6/2005 |
| JP | 2005-196989 A | 7/2005 |
| JP | 2005-228623 A | 8/2005 |
| JP | 2005-327682 A | 11/2005 |
| WO | WO 02/090826 A1 | 11/2002 |
| WO | WO 2004/055429 A1 | 7/2004 |

* cited by examiner

LUMINANCE COMPARISON

| | 18A | 18B | 18C |
|---|---|---|---|
| P 1 | 5970 cd/m$^2$ | 6050 cd/m$^2$ | 6070 cd/m$^2$ |
| P 2 | 6330 cd/m$^2$ | 6130 cd/m$^2$ | 6110 cd/m$^2$ |
| P 3 | 6030 cd/m$^2$ | 6020 cd/m$^2$ | 6090 cd/m$^2$ |
| P 4 | 6360 cd/m$^2$ | 6200 cd/m$^2$ | 6150 cd/m$^2$ |
| P 5 | 6080 cd/m$^2$ | 6070 cd/m$^2$ | 6100 cd/m$^2$ |
| AVERAGE | 6154 cd/m$^2$ | 9094 cd/m$^2$ | 6104 cd/m$^2$ |
| MAX.−MIN. | 390 cd/m$^2$ | 180 cd/m$^2$ | 80 cd/m$^2$ |

BACKLIGHT DEVICE AND TRANSMISSION TYPE LIQUID CRYSTAL DISPLAY APPARATUS

TECHNICAL FIELD

The present invention relates to a backlight device adapted for delivering rays of display light which have been emitted from a large number of light emitting diodes to a transmission type display panel, e.g., transmission type Liquid Crystal Display (LCD), etc., and a transmission type liquid crystal display apparatus using such a backlight device.

This Application claims priority of Japanese Patent Application No. 2004-238786, filed on Aug. 18, 2004, the entirety of which is incorporated by reference herein.

BACKGROUND ART

Since Liquid Crystal Display apparatuses can realize large-sized display screen, light weight, thin structure and/or low power consumption, etc. as compared to Cathode-Ray Tube (CRT), they are used in Television Image Receiver and/or display apparatus for various display purposes along with, e.g., self-light emitting type Plasma Display Panel (PDP), etc. In the liquid crystal display apparatus, liquid crystals are included between two transparent bases (substrates) of various sizes to apply voltage across the transparent bases to vary orientation of liquid crystal molecules to change light transmission factor to optically display a predetermined image, etc.

In the liquid crystal display apparatuses, since the liquid crystal itself is not light emitting body, there is provided a backlight unit functioning as a light source, e.g., at the rear face portion of the liquid crystal panel. The backlight unit comprises, e.g., primary light source, light guide plate, reflection film, lens sheet and/or diffusion plate, etc. and serves to deliver display light over the entire surface of the liquid crystal panel. In the backlight unit, Cold Cathode Fluorescent Lamp (CCLF) adapted so that mercury or xenon is included within fluorescent tube is conventionally used as primary light source. However, it is necessary to solve the problems that light emitting luminance that the cold cathode fluorescent lamp has is low, lifetime is short, and/or low luminance region exists at the cathode side so that uniformity ratio, etc. is bad, etc.

Meanwhile, in liquid crystal display apparatuses of the large size, there is generally provided an Area Litconfiguration Backlight unit in which plural elongated cold cathode fluorescent lamps are disposed at the rear face of the diffusion plate to deliver display light to the liquid crystal panel. Also in such area litconfiguration backlight unit, it is necessary to solve the problems resulting from the above-described cold cathode fluorescent lamp. Particularly, in the case where the area litconfiguration backlight unit is applied to such a large sized television image receiver having size above 40 inches, the problems of realization of high luminance and/or realization of high uniformity ratio become more conspicuous.

On the other hand, in the area litconfiguration backlight units, in place of the above-described cold cathode fluorescent lamp, attention is drawn to backlight of the Light Emitting Diode (hereinafter referred to as LED as occasion may demand) area light type in which a large number of red, green and blue LEDs of light three primary colors are two-dimensionally arranged at the rear face side of the diffusion film to obtain white light. Such LED backlight unit permits reduction of cost with realization of reduction of cost of LED, and permits display of high luminance on large-sized liquid crystal panel by low power consumption.

In various backlight units, there are arranged, between the light source unit and the transmission type liquid crystal panel, various optical members such as optical functional sheet block, diffusion light guide plate, light diffusion plate, and/or reflection sheet, etc which are adapted for performing functional conversion of display light which has been emitted from the light source, and serving to allow the display light to be uniform. The light diffusion plate used in the backlight unit is generally formed by transparent acrylic resin, etc. At the position opposite to the light source, there are formed light adjustment patterns having a function to allow a portion of incident display light to be transmitted therethrough, and to allow the other portion thereof to be reflected thereon. As a light diffusion plate, there is light diffusion plate described in the Japanese Patent Application Laid Open No. 1994-301034 publication. In the light diffusion plate described in this publication, band-shaped light adjustment pattern constituted by a large number of reflection dots is provided within the region opposite to the fluorescent tube. Reflection dots are formed so that according as distance from the axis of fluorescent tube increases, the area becomes small, whereby the light diffusion plate functions so that light transmission factor becomes higher according as distance from the fluorescent tube increases. Thus, homogenized illumination light is emitted on the whole.

Meanwhile, also in the LED backlight unit, it is conceivable that light diffusion plate is disposed between the transmission type liquid crystal panel and the light source unit in which light source blocks where a large number of LEDs are mounted are arranged as array to form a large number of light adjustment patterns at the light diffusion plate so as to respectively face the respective LEDs. At the respective light adjustment patterns, transmitting operation and reflecting operation of rays of display light which are emitted from LEDs facing thereto are controlled so that rays of display light are delivered from the entire surface of the light diffusion plate to the liquid crystal panel at a uniform light quantity. Thus, realization of high luminance and realization of high uniformity ratio are performed.

However, in the LED backlight unit, heat of large capacity produced from a large number of LEDs is exerted on the light diffusion plate formed by acrylic resin, etc. to produce large dimensional change at the light diffusion plate so that positional shift may take place at LEDs and the light adjustment pattern which are opposite to each other. Moreover, in the LED backlight unit, positional shift between LEDs and the light adjustment patterns which are opposite to each other may take place by unevenness of dimensional accuracy and/or assembling accuracy of the liquid crystal panel, the light source unit or the light diffusion plate, and print accuracy of the light adjustment pattern, etc.

In the LED backlight unit, it was difficult to extremely perform positioning of the LEDs and the light adjustment patterns with high accuracy because the above-described various factors are concerned. In the LED backlight unit, it is required to manufacture constitutent members with high accuracy and to perform precise assembling. As a result, it was difficult to reduce the cost. In the LED backlight unit, the positional shift between LED and light adjustment pattern becomes larger with realization of enlargement and/or realization of high luminance of the liquid crystal display apparatus. Thus, there become conspicuous the problems that color unevenness and/or ramp image may take place in the liquid crystal panel, etc.

Moreover, in the LED backlight unit, since the light source unit is adapted so that plural light source blocks where a large number of LEDs are mounted are arranged with a space provided therebetween to constitute area litconfiguration backlight unit, there takes place the phenomenon where rays of display light which have been radiated from respective LEDs toward the outer circumferential direction are concentrated from both sides between columns of the respective light source blocks so that there takes place the phenomenon where the portions where luminance is large take place. In the LED backlight unit, for the reason as stated above, high luminance region in the lateral stripe state takes place within opposite regions between respective columns of the respective light source blocks of the light diffusion plate. Thus, color unevenness of lateral stripe may disadvantageously take place at the liquid crystal panel.

In the LED backlight unit, it is conceivable to form light adjustment pattern by a large area at, e.g., light diffusion plate, and to form such plate by opalescent synthetic resin with respect to the above-described problems. However, since display light is shielded so that light transmission factor is reduced to much degree, luminance of the liquid crystal panel is lowered. In the LED backlight unit, in the case where, e.g., a larger number of LEDs are used so that compliance of realization of high luminance is performed, not only cost is increased and/or power consumption becomes larger, but also it becomes difficult to extremely comply with larger heat.

DISCLOSURE OF THE INVENTION

Problems to be solved by the invention

An object of the present invention is to provide a backlight device and a transmission type liquid crystal apparatus which solve the problems of prior arts conventionally proposed or conceived as described above, and adapted so that a large number of light emitting diodes are provided to perform realization of high luminance of the transmission type liquid crystal panel and to prevent occurrence of color unevenness and/or lateral stripe.

The backlight device to which the present invention is applied comprises a light diffusion plate disposed between a transmission type display panel and a light source unit in which plural light source blocks where a large number of light emitting diodes are mounted are arranged with a predetermined spacing therebetween, and adapted to allow a portion of rays of display light which have been emitted from the respective light emitting diodes to be transmitted therethrough, and to allow the other portion thereof to be reflected thereon to deliver the rays of display light thus obtained to the transmission type display panel from the entire surface thereof in the uniformed state. The light diffusion plate is formed by resin material having light transmitting characteristic, and is adapted so that light adjustment patterns, which are formed by printing light reflection ink to reflect display light, are formed within respective regions facing respective light emitting diodes of plane surfaces opposite to the light source blocks. The respective light adjustment patterns formed at the light diffusion plate are formed so as to take a shape having dimensions including outer shape of light emitting diode, and such that longitudinal width in a direction perpendicular to lateral width in a length direction of the respective light source blocks is caused to be major axis.

In the backlight device to which the present invention is applied, rays of display light which have been emitted from the respective light emitting diodes of the light source blocks are delivered to the display panel through the light diffusion plate. Thus, display of high luminance is performed at the display panel. Namely, at the light diffusion plate, light adjustment patterns formed in the state facing respective light emitting diodes serve to reflect display light to reduce occurrence of partial high luminance region. Thus, the display light is delivered from the entire surface of the light diffusion plate to the display panel in uniformed state.

In the backlight device to which the present invention is applied, even if slight positional shift takes place between light emitting diodes and light adjustment patterns which are opposite to each other in assembled state, transmission/reflection function by light adjustment pattern larger than the light emitting diode is held to deliver display light from the entire surface of the light diffusion plate to the display panel in uniformed state. Further, respective light adjustment patterns formed so as to take longitudinal elongated shape serve to suppress light transmission factor of display light in respective inter-column direction of the light source blocks with respect to rays of display light which have been emitted from the respective light emitting diodes. Moreover, the transmission type display panel realizes display of high accuracy in which occurrence of color unevenness, ramp image and/or lateral stripe has been prevented.

In addition, the transmission type liquid crystal display apparatus to which the present invention is applied comprises a liquid crystal panel, a light source unit, an optical functional sheet laminated body, a diffusion light guide plate, a light diffusion plate, and a reflection sheet. The light source unit is adapted so that plural light source blocks where a large number of light emitting diodes are mounted are arranged with a predetermined spacing therebetween, and serves to deliver rays of display light which have been emitted from the respective light emitting diodes from the rear face side with respect to the liquid crystal panel. The optical functional sheet laminated body serves to optically suitably perform functional conversion of rays of display light by respective functional optical sheets to deliver them to the liquid crystal panel. The diffusion light guide plate serves to diffuse, therewithin, rays of display light which have been incident from one surface to emit such rays of display light from the other surface to deliver them to the optical functional sheet laminated body. The light diffusion plate is disposed with a predetermined opposite spacing between the light diffusion plate and the diffusion light guide plate, and serves to allow a portion of rays of display light to be transmitted therethrough and to allow the other portion thereof to be reflected thereon to deliver the rays of display light thus obtained from the entire surface thereof toward the diffusion light guide plate in uniformed state. The light diffusion plate is formed by resin material having light transmitting characteristic, and is adapted so that there are formed light adjustment patterns, which are formed by printing light reflection ink to reflect rays of display light, within respective regions facing respective light emitting diodes of the plane surfaces opposite to the light source blocks. In the light diffusion plate, respective light adjustment patterns are formed so as to take a shape having dimensions including outer shape of the light emitting diode, and such that longitudinal width in a direction perpendicular to the lateral width in a length direction of the respective light source blocks is caused to be major axis. The reflection sheet is oppositely disposed with a predetermined spacing from the light diffusion plate at the rear face side of the light source unit, and serves to allow rays of display light which have been emitted from the respective light emitting diodes toward the outer circumferential direction and rays of display light which have been reflected on the light diffusion plate to be reflected toward the light diffusion plate side.

In the transmission type liquid crystal display apparatus to which the present invention is applied, rays of display light which have been emitted from respective light emitting diodes of the light source blocks are delivered to the liquid crystal panel through the light diffusion plate to realize display of high luminance on the liquid crystal panel.

In the backlight device and the transmission type liquid crystal display apparatus using such backlight unit to which the present invention has been applied, a large number of light emitting diodes are caused to be light source to realize display of high luminance so that the opposite state with respect to respective light emitting diodes facing the respective light adjustment patterns are held also with respect to dimensional change of respective constituent members, and/or unevenness of dimensional accuracy, and/or assembling accuracy of respective constituent members, and/or print accuracy of light adjustment pattern resulting from the influence of heat produced from the respective light emitting diodes to reduce occurrence of partial high luminance regions at the light diffusion plate so that realization of reduction of color unevenness occurrence can be performed along with realization of high luminance of the display panel.

In addition, in the present invention, occurrence of partial high luminance region at the light diffusion plate, which is produced between columns of respective light source blocks, is also reduced so that it is prevented that lateral stripe takes place at the display panel.

Still further objects of the present invention and practical merits obtained by the present invention will become more apparent from the embodiments which will be given below with reference to the attached drawings.

BRIEF DESCRIPTION OF THE DRAWINGS

FIGS. 3A and 3B show light diffusion plate, wherein FIG. 3A is an essential part plan view thereof and FIG. 3B is an essential part longitudinal cross sectional view thereof.

FIGS. 4A and 4B show the configuration of light adjustment pattern, wherein FIG. 4A is an essential part plan view thereof and FIG. 4B is an essential part longitudinal cross sectional view thereof.

BEST MODE FOR CARRYING OUT THE INVENTION

Embodiments of a transmission type liquid crystal color liquid crystal display apparatus (hereinafter simply referred to as liquid crystal display apparatus) to which the present invention is applied will be explained with reference to the attached drawings.

Figure 1:
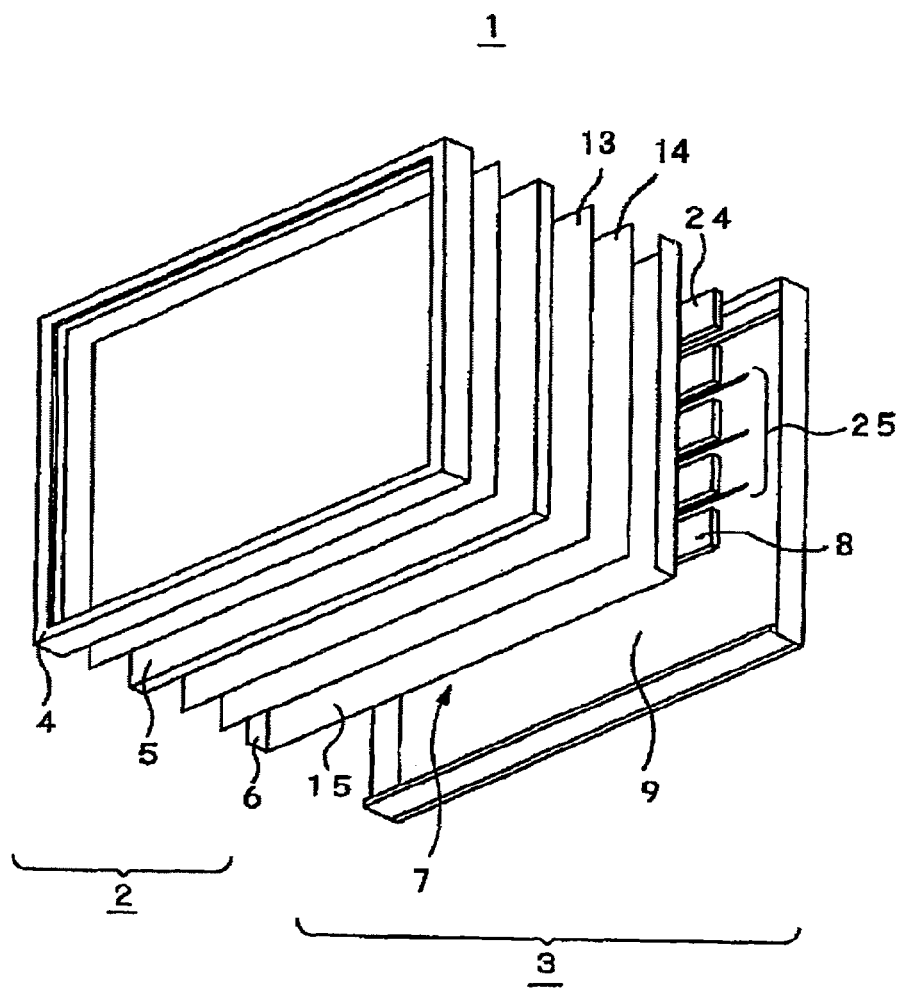
FIG. 1 is an essential part exploded perspective view showing a transmission type liquid crystal display apparatus to which the present invention is applied.
Figure 2:
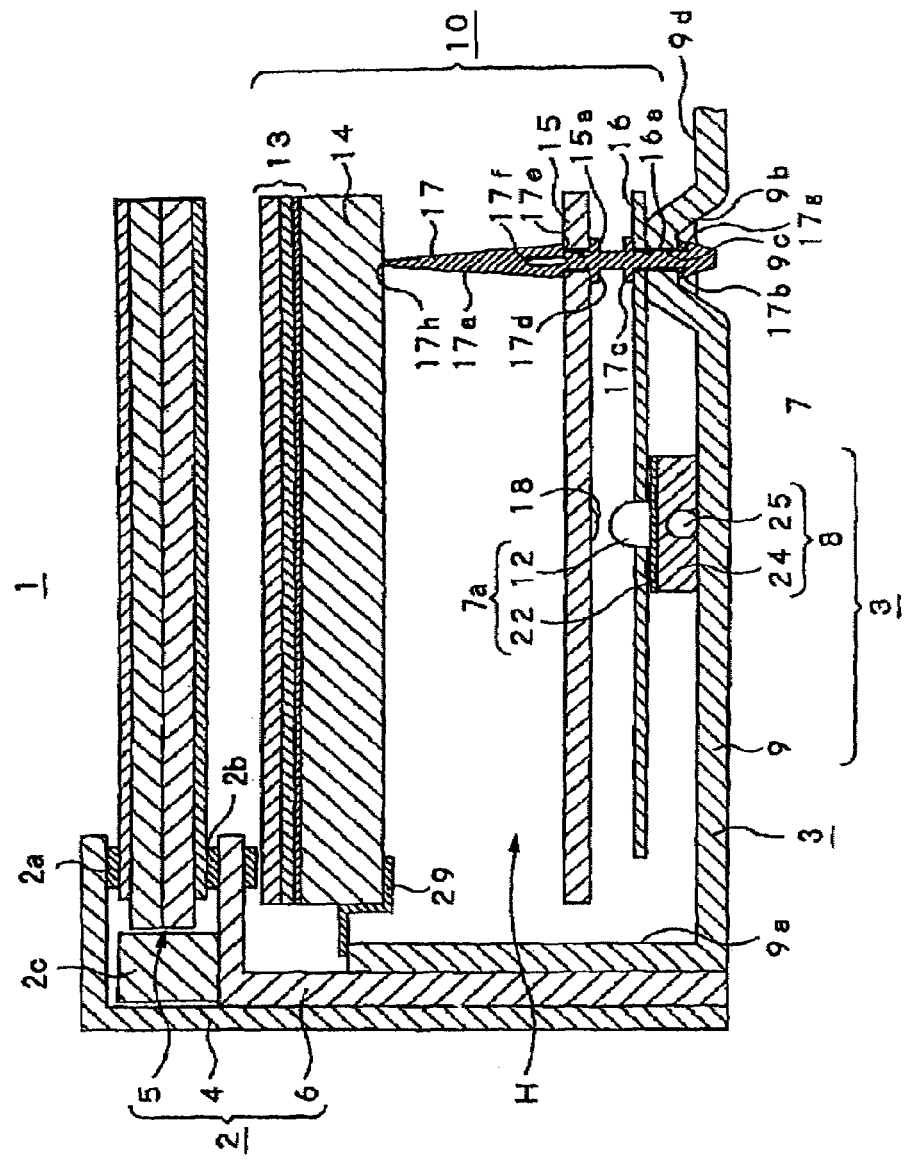
FIG. 2 is an essential part longitudinal cross sectional view of the liquid crystal display apparatus shown in FIG. 1.

The liquid crystal display apparatus 1 according to the present invention is used for display panel of television image receiver having large-sized display screen above, e.g., 40 inches, and/or display monitor, etc. As shown in FIGS. 1 and 2, the liquid crystal display apparatus 1 comprises a liquid crystal panel unit 2, and a backlight unit 3 combined with the rear face side of the liquid crystal panel unit 2 and serving to deliver display light. The liquid crystal panel unit 2 is composed of a frame-shaped front face frame member 4, a liquid crystal panel 5, and a frame-shaped rear face frame member 6 for holding the outer peripheral edge portion of the liquid crystal panel 5 through spacers 2a, 2b and guide member 2c, etc. being put between the liquid crystal panel 5 and the front face frame member 4 with the spacers 2a, 2b and the guide member 2c, etc. put therebetween.

Although the detail is omitted, the liquid crystal panel 5 is adapted to include liquid crystals between a first glass base (substrate) where, e, g., transparent segment electrodes are formed and a second glass base (substrate) where transparent common electrode is formed similarly to the first glass base with opposite spacing being held by spacer beads, etc. to apply voltage across electrodes formed on the respective glass bases to vary orientation of liquid crystal molecules to change light transmission factor. The liquid crystal panel 5 is adapted so that a stripe-shaped transparent electrode, an insulating film and an orientation film are formed at the internal surface of the first glass base. The liquid crystal panel 5 is adapted so that color filters of three primary colors, an overcoat layer, a stripe-shaped transparent electrode, and an orientation film are formed at the internal surface of the second glass base. The liquid crystal panel 5 is adapted so that deflection film and phase difference film are connected on the surfaces of the first and second glass bases.

The liquid crystal panel 5 is adapted so that the orientation film consisting of polyimide is caused to be of the configuration in which liquid crystal molecules are arranged at the interface in a horizontal direction, and deflection film and phase difference film allow the wavelength characteristic of display light to be non-colored and to be changed into white to perform realization of full color by color filters thus to perform color display of receive image, etc.

It is to be noted that the liquid crystal panel 5 used here is not limited to liquid crystal panel of such a structure, but liquid crystal panels of various configurations conventionally provided may be used.

The backlight unit 3 comprises a light source unit 7 disposed at the rear face side of the above-described liquid crystal panel unit 2 and serving to deliver display light, a radiating unit 8 for radiating heat which has been produced within the light source unit 7, a back panel 9 for holding the light source unit 7 and the radiating unit 8 and combined with the front face frame member 4 and the rear face frame member 6 to constitute attachment member with respect to casing (not shown). The backlight unit 3 has dimensions facing the rear face side of the liquid crystal panel unit 2 over the entire surface thereof, and is combined in the state where opposite spacing portion constituted between the backlight unit 3 and the liquid crystal panel 2 is optically hermetically sealed.

Figure 7:
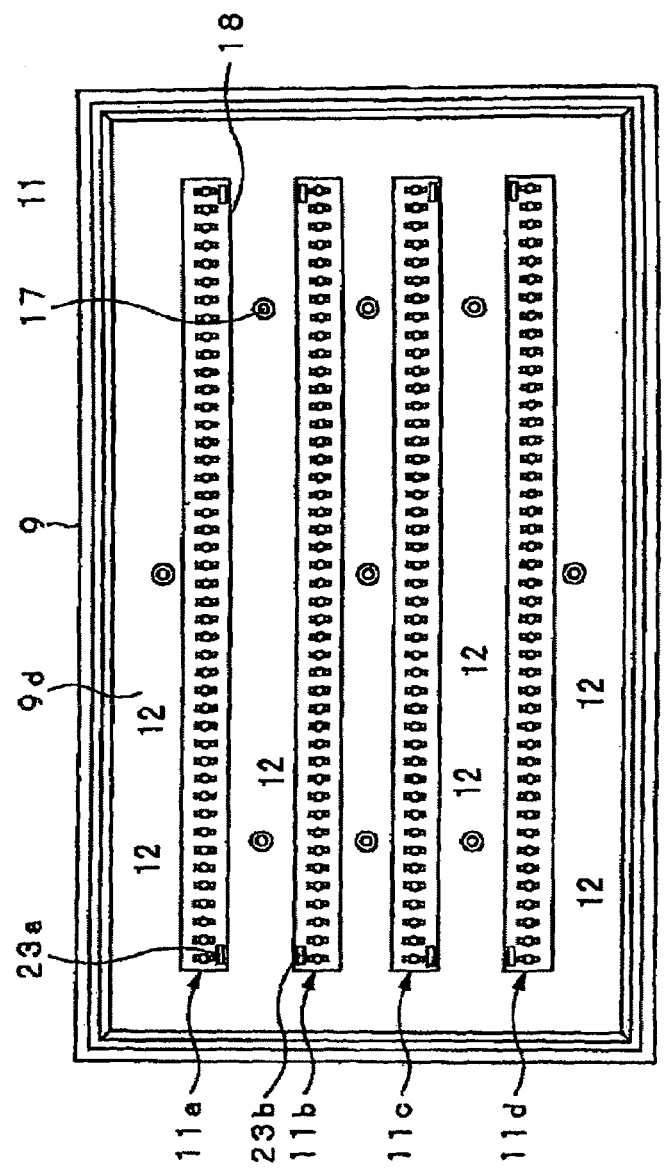
FIG. 7 is an essential part plan view showing light source unit.

Meanwhile, the light source unit 7 constituting the backlight unit 3 comprises an optical sheet block 10, and a light source block 11. As shown in FIG. 7, the light source block 11 includes plural light source element arrays 11a to 11d in which a large number of light emitting diodes (hereinafter referred to as LEDs) 12 are arranged in line. These light source element arrays 11a to 11d are disposed in parallel with a predetermined spacing therebetween.

The back panel 9 is formed by, e.g., material having relatively light weight and having high thermal conductivity, e.g., aluminum, and is formed so as to take laterally elongated rectangular shape having dimensions substantially equal to the outer shape of the liquid crystal panel 5. Since the back panel 9 itself also has thermal conductivity, it has an action to radiate heat produced from LEDs 12 and/or circuit parts (components), etc. At the outer peripheral edge side of the back panel 9, an outer circumferential wall portion 9a combined with the front face frame member 6 is formed in bent manner, and a large number of attachment portions 9b for attaching optical stud members 17 and/or an attachment hole for fixing the radiating plate 24 and/or draw-out opening for drawing out lead wires, etc. are formed as described later. At the back panel 9, as shown in FIG. 2, radiating unit 8, light source unit 7 and liquid crystal panel 5 are assembled with respect to the front face side thereof in the laminated state, and are further assembled with respect to attachment portion of the casing.

Further, as shown in FIG. 2, the optical sheet block 10 constituting the light source unit 7 is provided in the state facing the rear face side of the liquid crystal panel 5, and is composed of an optical functional sheet laminated body 13 in which various optical functional sheets are laminated, a diffusion light guide plate 14, a light diffusion plate 15, and a reflection sheet 16, etc. At the optical sheet block 10, there is oppositely arranged, at the rear face side of the liquid crystal panel 5, the optical functional sheet laminated body 13 with a predetermined spacing provided with respect to the liquid crystal panel 5, and the diffusion light guide plate 14 is laminated at further rear surface of the optical functional sheet laminated body 13.

The optical functional sheet laminated body 13 constituting the optical sheet block 10 serves to suitably convert display light emitted from the light source block 11 and incident onto the liquid crystal panel 5 into display light having a predetermined optical characteristic. The optical functional sheet laminated body 13 is caused to be of the configuration in which plural optical functional sheets for performing various optical functions, e.g., functional sheet for performing decomposition (separation) into orthogonal polarization component, functional sheet for compensating phase difference of light wave to perform realization of broad angle of visibility and/or prevention of coloring, and/or functional sheet for diffusing display light, etc. are laminated. It is to be noted that the optical functional sheet laminated body 13 is not limited to the above-described optical functional sheet laminated body 13 using optical functional sheets, but may be optical functional sheet laminated body 13 constituted by using, e.g., luminance improvement film for realizing improvement in luminance, phase difference film or two upper and lower diffusion sheets with which prism sheet is put or held therebetween, etc.

Further, at the rear face side opposite to the plane surface facing the liquid crystal panel 5 of the optical functional sheet laminated body 13, as shown in FIG. 2, there is laminated diffusion light guide plate 14. The diffusion light guide plate 14 is comprised of plate body having slight thickness which is formed by opalescent synthetic resin material having conductivity, e.g., acrylic resin or polycarbonate resin, etc. The diffusion light guide plate 14 serves to allow display light incident from one surface to be suitably refracted or reflected therewithin to guide the display light thus obtained toward the other surface side while diffusing it to allow the display light thus guided to be incident from the other surface side onto the optical functional sheet laminated body 13. Further, the diffusion light guide plate 14 is attached to the outer circumferential wall portion 9a of the back panel 9 through a bracket member 29 along with the optical functional sheet laminated body 13.

As shown in FIG. 2, the diffusion light guide plate 14 and the light diffusion plate 15, and the light diffusion plate 15 and the reflection sheet 16 which constitute the optical sheet block 10 are supported by a large number of optical stud members 17 so that they maintain a predetermined opposite spacing therebetween, and are attached to the back panel 9 through these optical stud members 17.

Figure 3A:
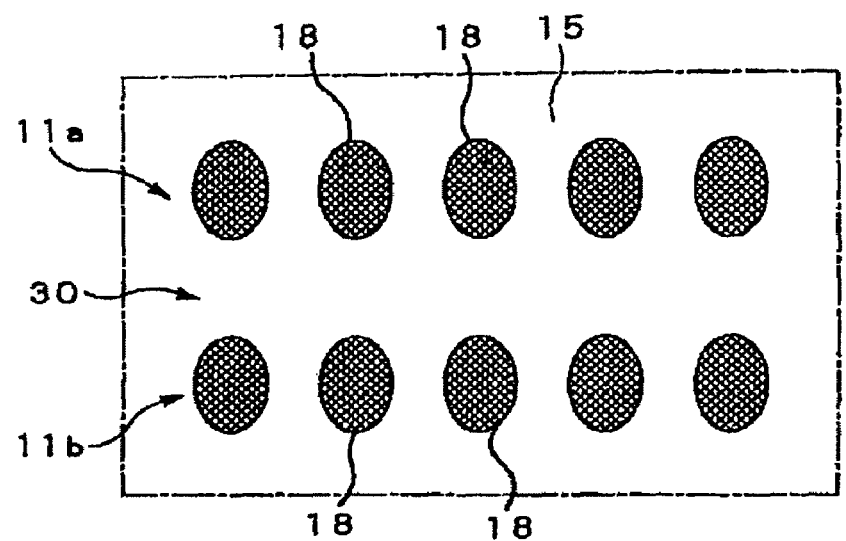
Figure 3B:
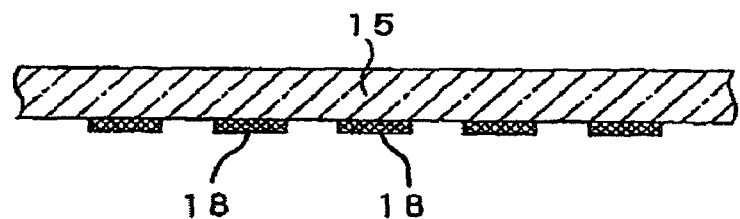

Here, the light diffusion plate 15 is a plate material formed by transparent synthetic resin material, e.g., acrylic resin, etc. and is adapted so that display light delivered from the light source block 11 is incident thereon. At the light diffusion plate 15, as shown in FIGS. 3A and 3B, a large number of light adjustment patterns 18 are formed in a matrix form. In this example, although the detail is omitted, fitting holes 15a into which the optical stud members 17 are respectively attached are formed at suitable positions of the light diffusion plate 15.

As shown in FIG. 2, the respective light adjustment patterns 18 respectively correspond to plural LEDs 12 constituting the light source block 11, and are formed at the light diffusion plate 15 so to face respective LEDs 12. In concrete terms, the respective light adjustment patterns 18 are formed at the light diffusion plate 15 in a matrix form so as to face the respective LEDs 12 of light source element arrays 11a to 11d arranged as shown in FIG. 7.

Further, as shown in FIG. 4, the respective light adjustment patterns 18 are respectively formed by printing, by, e.g., screen printing method, light reflection ink within a region where patterns are to be formed (hereinafter simply referred to as a pattern formation region) 20 having shape slightly larger than outer shape D of LEDs 12. At the respective light adjustment patterns 18, light reflection ink is formed by light reflection ink material in which various ink materials including light shielding agent and diffusion agent are mixed at a predetermined ratio. In the light reflection ink, there is included, as light shielding agent, e.g., titanium oxide, barium sulfide, calcium carbonate, silicon oxide, alumina oxide, zinc oxide, nickel oxide, calcium hydroxide, lithium sulfide, tri-iron tetroxide, methacrylic resin powder, mica (sericite), porcelain clay powder, carion, bentonite, gold powder or pulp fiber, etc. Moreover, in the light reflection ink, as diffusion agent, there is included, e.g., silicon oxide, glass beads, glass very fine powder, glass fiber, liquid silicon, crystal powder, gold plating resin beads, cholesteric liquid crystal liquid or recrystalline acrylic resin powder, etc.

Figure 4A:
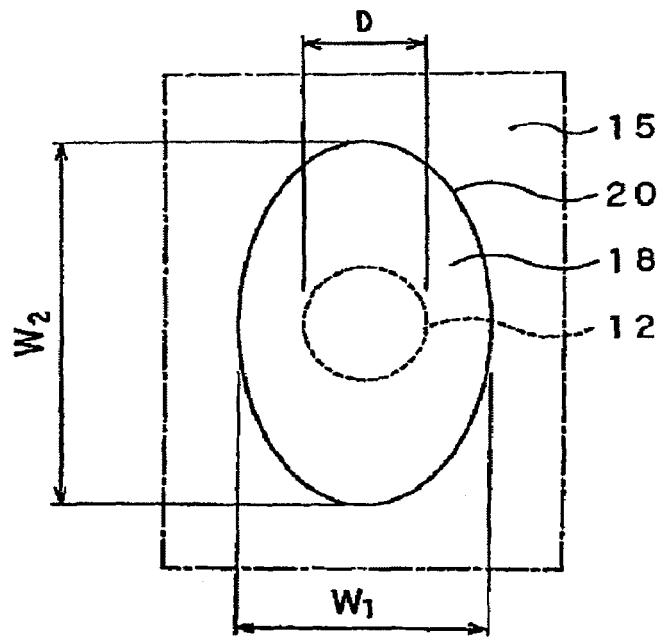
Figure 4B:
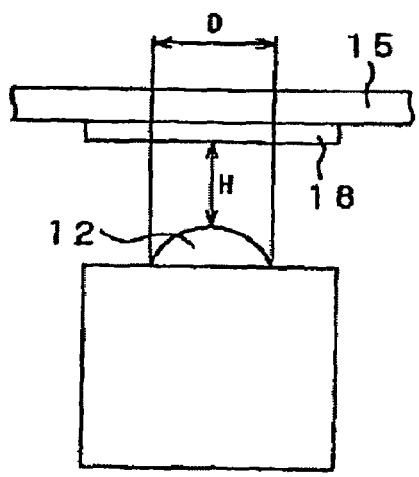

Here, when length of the abscissa in a direction extending in arrangement direction of respective LEDs 12 within respective light source element arrays 11a to 11d is assumed to be $W_1$ and length of the ordinate in a direction perpendicular to the arrangement direction of respective LEDs 12 is assumed to be $W_2$ as shown in FIG. 4, each light adjustment pattern 18 is formed as longitudinally elongated elliptical shape expressed by $W_2 > W_1$. In each light adjustment pattern 18, as shown in FIG. 4B, spacing $H_1$ between the surface thereof and summit point portion of each LED 12 is set to about 1.5 mm to 2.5 mm. As shown in FIG. 4A, respective light adjustment patterns 18 are formed with outer shape dimensions in which length $W_1$ of the abscissa is 7 mm to 8 mm (D+1 to 2 mm) and length $W_2$ of the ordinate is 9 mm to 12 mm ($W_1$+2 to 4 mm) with respect to the LED 12 having diameter D as shown in FIG. 4A.

The respective light adjustment patterns 18 constituted as stated above serve to reflect rays of display light emitted from LED 12 facing thereto and going straight toward the light diffusion plate 15 to shield it. Accordingly, the light diffusion plate 15 allows display light to be shielded within the pattern formation region 20 where respective light adjustment patterns 18 are formed, and allows the display light to be transmitted within non-formation regions of the light adjustment patterns 18. The light diffusion plate 15 functions to adjust transmission quantity of rays of display light which are directly incident from LEDs 12 facing the light adjustment patterns 18 formed therein to reduce occurrence of partial high luminance region to allow display light to be uniform from the entire surface thereof to deliver it toward the diffusion light guide plate 14.

In the light diffusion plate 15, as described above, respective light adjustment patterns 18 are formed within pattern formation region 20 having shape larger than outer shape of the respective LEDs 12 facing thereto. Accordingly, even if there takes place slight positional shift between the respective light adjustment patterns 18 and the LEDs 12 resulting from the dimensional accuracy thereof, print accuracy of the respective light adjustment patterns 18, dimensional change of swelling or contraction based on heat produced from a large number of LEDs 12, and/or dimensional accuracy or assembling accuracy of respective constituent members of the liquid crystal display apparatus 1, etc., the light diffusion plate 15 can securely perform transmission control of the above-described display light. The light diffusion plate 15 permits the conditions of processing error and/or assembling accuracy of respective constituent members to have margin. As a result, the manufacturing process becomes easy and reduction of manufacturing cost can be realized. It is to be noted that when a portion of rays of display light emitted from respective LEDs 12 is incident in the state above critical angle, the light diffusion plate 15 also has a function to reflect it on the surface thereof.

Meanwhile, the light diffusion plate 15 has a function to suitably adjust transmission quantity of rays of display light which have been emitted from the LEDs 12 by the shape of the above-described light adjustment pattern 18. FIGS. 5 and 6 show results obtained by measuring luminance values of respective portions at the outgoing side principal surface of display light with respect to light diffusion plate 15 in which two kinds of elliptical light adjustment patterns 18 where circular shape and dimensions are changed are formed. Measurement of luminance will be described below. Namely, as shown in FIG. 5A, measurements of surface luminance of the light diffusion plate 15 were respectively performed by luminance meter at position $P_1$ immediately above respective LEDs 12 arranged in line at light source element array 11a of the first column, central position $P_2$ of a first non-pattern formation region 30a constituted between light source element array 11a of the first column and light source element array 11b of the second column arranged in parallel to the light source element array 11a, position $P_3$ immediately above LED12 arranged at light source element array 11b of the second column, central position $P_4$ of the second non-pattern formation region 30b constituted between the light source element array 11b of the second column and light source array 11c of the third column disposed in parallel to the light source element array 11b, and position $P_5$ immediately above LED12 arranged at light source element array 11c of the third column.

The light diffusion plate 15 is adapted so that first circular light adjustment pattern 18A having diameter of 7 mm, a second light adjustment pattern 18B of first longitudinally elongated elliptical shape where the abscissa is 7 mm and the ordinate is 9.5 mm, and a third light adjustment pattern 18C of second longitudinally elongated elliptical shape where the abscissa is 7 mm and the ordinate is 11 mm are formed at the plane surface facing the LED12 by the same light reflection ink. In the light diffusion plate 15, spacing between the light source element array 11a of the first column and the light source element array 11b of the second column and spacing between the light source element array 11b of the second column and the light source element array 11c of the third column are equal to each other, and are set to 80 mm to 90 mm.

Figures 5A, 5B:
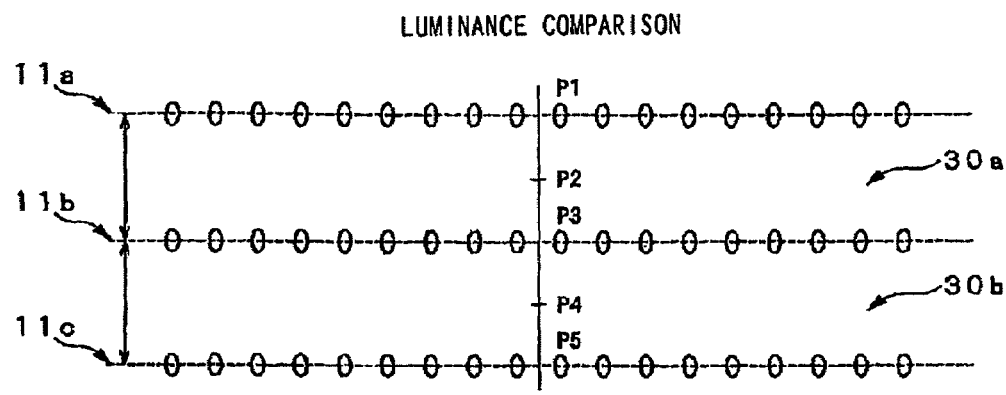
FIGS. 5A and 5B are views showing measurement results of luminance at light diffusion plate in which light adjustment patterns different in shape are formed.
Figure 6:
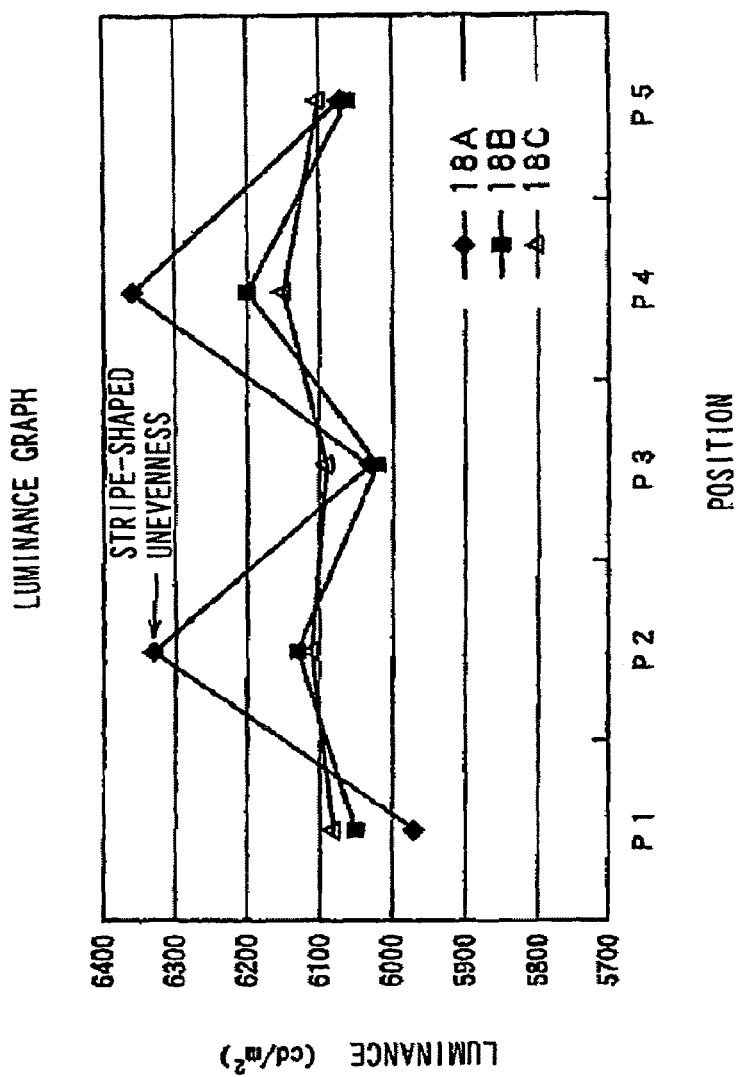
FIG. 6 is a graph showing measurement result of luminance.

As apparent from the measurement result of luminance shown in FIGS. 5B and 6, in the light diffusion plate 15A where circular first light adjustment pattern 18A is formed, luminance is lowered by light shielding action of display light by the first light adjustment pattern 18A at positions $P_1$, $P_3$, $P_4$ immediately above the respective LEDs 12. In the light diffusion plate 15A, luminance is 6300 cd/mm$^2$ or more at light source array central positions $P_2$, $P_4$ facing the non-pattern formation regions 30a, 30b. In the light diffusion plate 15A, the entire average luminance becomes equal to 6200 cd/cm$^2$ or more so that realization of high luminance is performed, but there takes place luminance difference of about 400 cd/mm$^2$ between the low luminance region and the high luminance region. In the light diffusion plate 15A, rays of display light which have been radiated in outer circumferential direction from the LEDs 12 are concentrated at central positions $P_2$, $P_4$ of the light source element arrays 11a, 11b, 11c so that high luminance region in parallel to the LED column takes place. As a result, lateral stripe would take place. In addition, in the light diffusion plate 15A, color unevenness takes place by positional shift between LED12 and first light adjustment pattern 18A.

In the light diffusion plate 15B where second light adjustment pattern 18B of the first longitudinally elongated elliptical shape is formed, as apparent from measurement result of luminance shown in FIGS. 5 and 6, luminance is lowered by light shielding action of display light by the first light adjustment pattern 18A at positions $P_1$, $P_3$, $P_4$ immediately above the LED 12. In the light diffusion plate 15B, averaging in a direction perpendicular to the LED column is realized by ellipitical second light adjustment pattern 18B. There results slightly high luminance within the non-pattern formation regions 30a, 30b, but luminance difference between the low luminance region and the high luminance region is about 180 cd/mm$^2$. In the light diffusion plate 15B, occurrence of high luminance region in parallel to the LED column is suppressed so that occurrence of lateral stripe is reduced. Moreover, in the light diffusion plate 15B, the entire averaging luminance is value slightly below about 6100 cd/mm$^2$. This value is slightly lower than luminance value by the above-described light diffusion plate 15A, but practically sufficient luminance is ensured. However, in the light diffusion plate 15B, there is possibility that high luminance region may take place in arrangement direction of LEDs 12 by positional shift between the LEDs 12 and the second light adjustment pattern 18b so that color unevenness takes place.

In the light diffusion plate 15C where the third light adjustment pattern 18C of the second longitudinally elongated elliptical shape is formed, as apparent from measurement result of luminance shown in FIGS. 5 and 6, realization of uniformity of luminance is further performed as compared to the above-described light diffusion plate 15B. In the light diffusion plate 15C, occurrence of high luminance region in parallel to the LED column is greatly suppressed so that occurrence of lateral stripe is securely prevented. In the light diffusion plate 15C, since the entire average luminance is also above about 6100 cd/mm$^2$, realization of practical high luminance is performed. In the light diffusion plate 15C, even if positional shift takes place between the LEDs 12 and the second light adjustment pattern 18B, those opposite states are held by the large third light adjustment pattern 18C to eliminate occurrence of high luminance region, thus making it possible to securely prevent occurrence of color unevenness.

It is to be noted that while, in the light diffusion plate 15, the light adjustment pattern 18 is formed so as to take longitudinally elongated elliptical shape within the pattern formation region 20 of large region including outer shape of LEDs 12 facing thereto as described above, it is not limited that the light adjustment pattern 18 has such ellipitical shape. The light adjustment pattern 18 may be formed so as to take a suitable shape such as pattern of longitudinally elongated rectangular shape or polygonal shape, and/or longitudinally elongated elliptical pattern, etc. Moreover, in the light diffusion plate 15, the light adjustment pattern 18 is formed as full painted pattern uniformly coated over the entire surface of the pattern formation region 20, but may be constituted by, e.g., a large number of dot patterns. Further, the light diffusion plate 15 may be also constituted as the so-called gradation pattern in which light adjustment pattern 18 consisting of such dot pattern is adapted so that dot density at the central portion thereof is larger than dot density of the peripheral portion. Moreover, the light adjustment pattern 18 is not limited to light adjustment pattern having the above-described dimensional values, but is suitably selected in accordance with the specification of the liquid crystal display apparatus 1.

Further, the reflection sheet 16 constituting the optical sheet block 10 serves to reflect rays of display light which have been reflected within the region where light adjustment pattern 18 of the light diffusion plate 15 and/or light adjustment pattern 18 of the light diffusion plate 15 are not formed, or rays of display light which have been emitted in outer circumferential direction from the LEDs 12 to allow the rays of display light thus obtained to be incident onto the light diffusion plate 15 for a second time. The reflection sheet 16 is formed by porous PET (polyethylene terephthalate) including, e.g., fluorescent agent. Since the reflection sheet 16 has the feature that porous PET has high reflection factor characteristic of about 95% and damage of reflection surface is not conspicuous by color tone different from metallic glossy color, the reflection sheet 16 efficiently reflect display light. The reflection sheet 16 also has a function to repeatedly reflect display light between the reflection sheet 16 and the light diffusion plate 15 to realize improvement in reflection factor based on the amplifying reflection principle. It is to be noted that the reflection sheet 16 may be also formed by silver, aluminum or stainless steel having mirror surface, etc. In addition, the reflection sheet 16 may be also constituted by, e.g., attaching the above-described porous PET onto aluminum plate.

Further, at the optical sheet block 10, as shown in FIG. 2, there are provided a large number of optical stud members 17. The optical sheet block 10 is caused to be of the configuration to maintain, with high accuracy, over the entire surface thereof, degree of parallelism between plane surfaces of the light diffusion plate 15 and the reflection sheet 16 which are opposite to each other, and to maintain, with high accuracy, over the entire surface thereof, degree of parallelism between plane surfaces of the diffusion light guide plate 14 and the light diffusion plate 15 which are opposite to each other by these optical stud members 17. The optical stud member 17 is integrally formed by opalescent synthetic resin material having light guiding characteristic and mechanical rigidity and having a certain elasticity, e.g., polycarbonate resin, etc. As shown in FIG. 2, the optical stud members 17 are respectively attached to attachment portions 9b of substantially trapezoidal projections which are integrally formed at the internal surface of the back panel 9 as shown in FIG. 2.

As shown in FIG. 2, the back panel 9 is adapted so that the upper surface of the attachment portion 9b constitutes the mounting surface of the reflection sheet 16 and plural attachment holes 9c are formed in the state penetrated therethrough. At the optical sheet block 10, the light diffusion plate 15 and the reflection sheet 16 are respectively combined after undergone positioning on the bottom surface 9d with respect to the back panel 9 through the respective optical stud members 17. At the light diffusion plate 15 and the reflection sheet 16, a large number of fitting holes 15a, 16a are respectively formed in correspondence with attachment holes 9c provided at respective attachment portions 9b of the back panel 9 side.

Each optical stud member 17 is composed of an axial base portion 17a, a fitting portion 17b formed at the base end portion of the axial base portion 17a, a flange-shaped first receiving plate portion 17c integrally formed at the periphery of the axial base portion 17a with a predetermined spacing from the fitting portion 17b, and a flange-shaped second receiving plate portion 17d integrally formed at the periphery of the axial base portion 17a with a predetermined spacing from the first receiving plate portion 17c. At respective optical stud members 17, the axial base portion 17a is formed with an axial length which prescribes opposite spacing between the attachment portion 9b of the back panel 9 and the diffusion light guide plate 14, and an offset portion 17e is formed at a predetermined height position from the second receiving plate portion 17d.

At the respective stud members 17, the axial base portion 17a is formed so as to take major axial cone shape in which the offset portion 17e is caused to have diameter larger than fitting hole 15a of the light diffusion plate 15 and the diameter becomes small according as distance to the front end portion increases. At the respective optical stud members 17, a thickness stealing hole 17f in the axial direction is formed at the axial base portion 17a in the state positioned slightly above the offset portion 17e. The thickness stealing hole 17f is formed at the axial base portion 17a within the range of the portion where its outer diameter is caused to be larger than fitting hole 15a of light diffusion plate 15, and convergence habit characteristic is rendered to this portion.

At the respective optical stud members 17, the first receiving plate portion 17c and the second receiving plate portion 17d are formed with a spacing sufficient to maintain opposite spacing between the light diffusion plate 15 and the reflection sheet 16. At the respective optical stud members 17, the axial base portion 17a is formed so that the portions of the first receiving plate portion 17c and the second receiving plate portion 17d are caused to be substantially the same diameter as that of fitting hole 15a of the light diffusion plate 15. The respective optical stud members 17 take a shape substantially conical in cross section in which the outer diameter of the front end portion is caused to be outer diameter substantially equal to attachment hole 9c of the back panel 9 side and the diameter gradually becomes larger than that of the attachment hole 9c in the axial direction. At the respective optical stud members 17, the fitting portion 17b is adapted to form slot 17g from diameter-enlarged portion toward the front end side thereof, whereby convergence habit characteristic is rendered thereto.

At the respective optical stud members 17, the axial base portion 17a is formed in the state where spacing between the fitting portion 17b and the first receiving plate portion 17c is caused to be nearly equal to the thickness of the back panel 9 and the thickness of the light diffusion plate 15. Each optical stud member 17 is formed in the state where the first receiving plate portion 17c is caused to have diameter larger than fitting hole 15a of the light diffusion plate 15 and the second receiving plate portion 17d is caused to have diameter larger than the fitting hole 16a of the reflection sheet 16.

Further, the reflection sheet 16 is combined in the state where the attachment hole 9c and the fitting hole 16a are combined in the state opposite to each other on the attachment portion 9b of the back panel 9. Further, fitting portions 17b of the respective optical stud members 17 are thrust or forced from the bottom face 9d side of the back panel 9 into the fitting hole 16a of the reflection sheet 16. As the result of the fact that the diameter of the fitting portion 17b is reduced by action of slot 17g provided at the fitting portion 17b and is penetrated through attachment hole 9c of the back panel 9 side so that the fitting portion 17b is then elastically returned, prevention of slip-off of the respective optical stud members 17 is realized. Thus, the respective optical stud members 17 are vertically assembled onto the attachment portion 9b.

Further, the respective optical stud members 17 hold, in a thickness direction, the attachment portion 9b and the reflection sheet 16 between the fitting portion 17b and the first receiving plate portion 17c to hold the reflection sheet 16 in the state where it is caused to undergo positioning with respect to the back panel 9. Moreover, the respective optical stud members 17 are vertically attached on the attachment portion 9b of the back panel 9 in the state where the upper portions from the first receiving plate portion 17c of the axial base end portion 17a are respectively projected from the reflection sheet 16.

Further, the front end portions 17h of the optical stud members 17 opposite to each other are fitted and inserted with respect to plural fitting holes 15a so that the light diffusion plate 15 is combined with the optical stud members 17. Further, as the result of the fact that the thin thickness portion 17f provided at the diameter-enlarged portion of each optical stud member 17 is deformed so that its diameter is shrunk (reduced) thereafter to perform elastic returning operation so that the light diffusion plate 15 is tightly fitted into the diameter-enlarged portions of the respective optical stud members 17. The light diffusion plate 15 is adapted to ride on the offset portions 17e provided at each optical stud member 17 to collide with the second receiving plate portion 17d so that the light diffusion plate 15 is put or held between the offset portion 17e and the second receiving plate portion 17d. At this time, the upper sides from the second receiving plate portions 17d of the axial base portions 17a of respective optical stud members 17 are projected from the light diffusion plate 15 as shown in FIG. 2. Further, at the front end portions 17h of the respective optical stud members 17, diffusion light guide plate 14 in which optical functional sheet laminated body 13 is overlaid is supported in the state where the bottom surface side thereof is caused to collide therewith.

In the optical sheet block 10 constituted as stated above, by a simple method of pushing fitting portion 17b into attachment hole 9c, a large number of optical stud members 17 respectively assembled onto the bottom surface 9d of the back panel 9 allow the light diffusion plate 15 and the reflection sheet 16 to undergo positioning, and to maintain, with high accuracy, opposite spacing between the light diffusion plate 15 and the reflection sheet 16 and spacing between the diffusion light guide plate 14 and the optical functional sheet laminated body 13. Further, in the optical sheet block 10, plural optical stud members 17 are provided so that complicated positioning structure and/or space maintaining structure become unnecessary and simplification of the assembling steps is realized. The respective optical stud members 17 can be compatibly used also with respect to liquid crystal panels 5 of various sizes. Thus, it becomes possible to commonly use parts (components).

It is to be noted that the optical stud member 17 is not limited to the above-described structure, but practical structure of respective portions may be suitably selected by the configuration of the optical sheet block 10. While slot 17g is formed at, e.g., fitting portion 17b so that the optical stud member 17 is permitted to undergo elastic deformation to only perform push-in operation with respect to the attachment hole 9c of the back panel 9 to have ability to attach it, e.g., slip-off projection may be integrally formed at, e.g., the outer circumferential portion to fit it into attachment hole 9c in which key groove is formed at the inner circumferential portion thereafter to perform rotation so that prevention of slip-off of the optical stud member 17 is performed.

As the result of the fact that the respective optical members are caused to undergo positioning with high accuracy to each other in the optical sheet block, the operations such as light-guide, diffusion and reflection, etc. are performed in the state where display light is stable within light guide space portion H constituted between the diffusion light guide plate 14 and the reflection sheet 16 as shown in FIG. 2. From this fact, it is suppressed that occurrence of color unevenness, etc. takes place at the liquid crystal panel 5. Moreover, respective optical stud members 17 provided within the light guide space portion H are formed by opalescent synthetic resin material having light guiding characteristic to diffuse display light incident from the outer circumferential surface thereof thereinto to prevent the front end portion 17h from being partially light-emitted, thus permitting display light to be uniformly incident from the light guide space portion H onto the diffusion light guide plate 14.

Meanwhile, the light source unit 7 constituting the backlight unit 3 comprises the optical sheet block 10, thus allowing rays of display light emitted from respective LEDs 12 of the light source block 11 through the optical sheet block 10 to be efficiently incident on the liquid crystal panel unit 2 in the stable state.

As shown in FIG. 7, the light source block 11 constituting the light source unit 7 is caused to be of the configuration in which four columns of light source element arrays 11a to 11d are arranged in parallel to each other along length direction of the back light 9 on bottom surface 9d of the back panel 9.

It is to be noted that respective light source element arrays 11a to 11d may be caused to be of the configuration in which optical array elements where several LEDs are arranged in series are serially continued.

Figure 8:
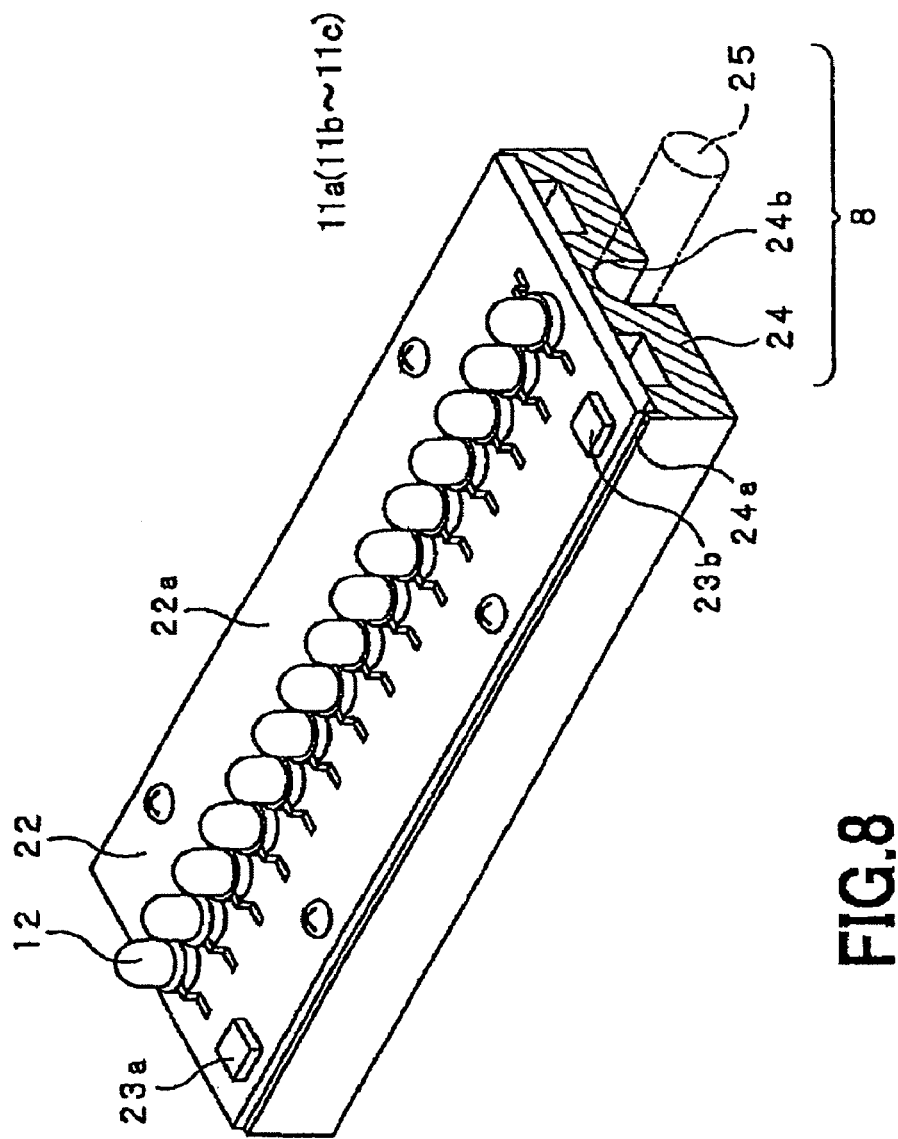
FIG. 8 is an essential part perspective view showing light source block.

As shown in FIGS. 2 and 8, respective light source element arrays 11a to 11d constituting the light source block 11 are composed of plural red LEDs, green LEDs and blue LEDs (hereinafter generally called LEDs 12), a laterally elongated rectangular wiring board 22 for mounting these LEDs 12 in the state arranged in a predetermined order in length direction on the principal surface 22a, and lead wires with connector (not shown), etc. The number of light source element arrays 11a to 11d and/or the number of LEDs 12 mounted thereon are suitably determined depending upon the size of display screen and/or light emitting ability of respective LEDs 12, etc.

Further, on the principal surface 22a of the wiring board 22, there are formed wiring patterns for connecting respective LEDs in parallel, and/or lands for connecting terminals of respective LEDs 12, etc. The respective wiring boards 22 are all formed by the same specification, wherein a first connector 23a of the signal output side and a second connector 23b of the signal input side are mounted in the vicinity of one side portion in a width direction of the principal surface 22a and in the state positioned at both sides in the length direction.

Moreover, the light source element array 11a of the first column and the light source element array 11b of the second column, and the light source element array 11c of the third column and the light source element array 11d of the fourth column respectively form pairs. As shown in FIG. 7, the respective wiring boards 22 are caused to be in parallel along length direction in the state where the side edge sides where the connector 23 is mounted are opposite to each other to constitute the light source block 11. Here, in the light source block 11, adjacent wiring boards 22 of respective light source element arrays 11a to 11d are arranged in such a manner that the first connector 23a and the second connector 23B are adjacent to each other. These wiring boards 22 are connected by lead wires with connector (not shown) so that the wiring boards 22 of the respective light source element arrays 11a to l d are connected by the shortest wiring.

The light source block 11 is caused to be positioned between the light source element array 11a of the first column and the light source element array 11b of the second column and between the light source element array 11c of the third column and the light source element array 11d of the fourth column to draw out lead wires for signal output from the wiring boards 22 of the respective light source element arrays 11a to 11d to clamp those lead wires by damper to draw out them toward the rear face side of the back panel 9 through draw-out opening. In the light source block 11, the structure for holding and/or guiding lead wires for signal input/output utilizing spaces between respective light source element arrays 11a to 11d is provided so that improvement in efficiency of space and/or simplification of wiring process steps are realized. Further, in the respective light source element arrays 11a to 11d, erroneous assembling of respective wiring boards is prevented by positions of the first and second connectors 20a and 20b, and wiring structure between wiring boards 22, simplification of wiring process steps and/or common use of lead wires for signal input/output are realized.

The respective light source element arrays 11a to 11d are mounted in such a manner that plural sets of LEDs in which red LEDs, green LEDs and blue LEDs which respectively emit three primary colors of red, green and blue are arranged in order recited are positioned on the same axis of the principal surface 22a of the wiring board 22. Although the detail is omitted, in the respective LEDs 12, light emitting elements are respectively held by resin holder, and lead terminals for connection are drawn out from the resin holder. The respective LEDs 12 emit rays of display light and also produce heat in this instance.

At the light source unit 7, since the light source block 11 is combined with the rear face side of the optical sheet block 10 as described above so that light guide space portion H in which the periphery thereof is hermetically sealed is constituted, the light source unit 7 is placed in the state where heats respectively produced from a large number of LEDs 12 result in large quantity of heat so that they are filled within light guide space portion H.

In view of the above, the backlight unit 3 efficiently radiates heat filled within the light guide space portion H by the radiating unit 8 to suppress characteristic changes of the above-described respective optical sheet bodies of the optical sheet block 10, unstabilization of lighting states of respective LEDs 12, color unevenness of the liquid crystal panel 5, and/or unstabilization of operations of electronic parts (components), etc. constituting circuit units.

As shown in FIG. 8, the radiating unit 8 is composed of plural radiating plates 24 doubling as attachment members provided every the above-described respective light source element arrays 11a to 11d, a large number of heat pipes 25 respectively attached to these radiating plates 24, heat sinks (not shown) adapted so that both end portions of these heat pipes 25 are connected, and cooling fan for hastening cooling function of the heat sinks, etc. As the detail will be described later, in the radiating unit 8, heat pipes 25 are integrally assembled with respect to the respective radiating plates 24 to constitute efficient thermal conduction path with respect to the heat sinks.

The respective radiating plates 24 are formed by aluminum which is excellent in thermal conductivity, good in processing characteristic, light in weight, and inexpensive, and is formed so as to take elongated rectangular shape nearly equal to length and width of the above-described respective light source element arrays 11a to 11d by extrusion. The respective radiating plates 24 are formed with a predetermined thickness having mechanical rigidity because they double as attachment member for the light source block 21. It is to be noted that it is not limited that respective radiating plates 24 are formed by aluminum, but may be also formed by material having satisfactory thermal conductivity, e.g., aluminum alloy, magnesium alloy, silver alloy or copper, etc. In the case where the respective radiating plates 24 are relatively small, they are formed by, e.g., press processing or cutting processing, etc. In this case, wiring board 22 is fixed on the principal surface 24a by attachment screw.

At each radiating plate 24, there is formed a heat pipe fitting portion 24b comprised of substantially arc shaped recessed groove in cross section adapted so that heat pipe 25 is fitted at the rear face side. The heat pipe fitting portion 24b has an opening width substantially equal to the outer diameter of the heat pipe 25, and is formed so that it has slightly shallow depth, whereby it is formed so as to have opening shape capable of provisionally holding the heat pipe 25 without intervention of holding member, etc. At the respective radiating plates 24, heat pipes 25 are disposed by heat pipe fitting portion 24b at a position nearer to LED mounting region where the temperature of the wiring board 22 is the highest.

The heat pipe 25 is a member generally employed in order to perform thermal conduction from the power supply unit, etc. where temperature is high in various electronic equipments, etc. toward radiating means, and is caused to be of the configuration in which there is filled conduction medium such as water, etc. vaporized at a predetermined temperature in the state where the inside of metallic pipe member consisting of copper having excellent thermal conductivity is evacuated. The heat pipe 25 has high performance thermal conducting ability. As described above, the heat pipes 25 are assembled integrally with respective radiating plates 24 as described above, and both end portions thereof are connected to heat sinks along with respective radiating plates 24. At the heat pipes 25, conduction medium which has been filled therewithin after undergone thermal conduction from the radiating plate 24 of the high temperature side is vaporized from liquid to gas. The conduction medium thus vaporized flows toward the connecting portion to the heat sink 26 of the lower temperature side within the pipe so that it is cooled. Thus, condensed heat is discharged and is liquefied. The conduction medium thus liquefied moves toward the radiating plate 24 side by capillary phenomenon within a large number of grooves or porous layers in a length direction which are formed at the inner wall of the metallic pipe so that circulation within the pipe is performed. Thus, high performance thermal conducting action is effected.

As described above, high performance heat pipe 25 having thermal conducting ability is integrally attached to the radiating plate 24, whereby the radiating unit 8 is caused to be of the configuration in which the heat pipes 25 are extended in the state close to the portion immediately below the arrangement region of respective LEDs 12 of heat producing source. The radiating unit 8 constitutes thermal conducting body to the heat sink in which wiring board 22 on which respective LEDs 12, radiating plate 24 for holding the wiring board 22 and the heat pipes 25 are overlaid in the state where they are closely in contact with each other. By providing such configuration, space efficiency of the radiating unit 8 is realized to extremely efficiently conduct heat produced from respective LEDs 12 toward the heat sinks to reduce elevation of temperature of the light guide space portion H so that the backlight unit 3 delivers display light to the liquid crystal panel 5 by stable operation.

The liquid crystal display apparatus 1 to which the present invention is applied, which has been constituted as stated above, is caused to be of the configuration in which plural light source element arrays 11$a$ to 11$d$ are combined, and is adapted so that light source unit 7 using light source block 11 where a large number of LEDs 12 are arranged in a matrix form is caused to be light source to deliver rays of display light of high capacity which have been emitted from the respective LEDs 12 to the liquid crystal panel unit 2 through the optical sheet block 10. The liquid crystal display apparatus 1 serves to efficiently radiate heat produced from the respective LEDs 12 by the radiating unit 8. Further, the light diffusion plate 15 constituting the optical sheet block 10 serves to limit incidence of direct incident component of rays of display light which have been emitted from respective LEDs 12 by the light adjustment patterns 18.

Moreover, the liquid crystal display apparatus 1 to which the present invention is applied serves to reflect, by the reflection plate 16, display light which has been reflected by the light diffusion plate 15 to allow the reflected light thus obtained to be incident onto the light diffusion plate 15 to realize improvement in light efficiency to further emit display light caused to be uniform, which has been obtained by removing partial high luminance component from the entire surface of the light diffusion plate 15, to deliver the display light thus obtained to the diffusion light guide plate 14.

Furthermore, the liquid crystal display apparatus 1 to which the present invention is applied serves to suitably reflect and refract display light within the diffusion light guide plate 14 to allow the display light thus obtained to be further uniform to deliver this display light to the optical functional sheet laminated body 13 to perform an operation to perform conversion into display light having a predetermined optical characteristic at the optical functional sheet laminated body 13 to perform supply of display light from the optical functional sheet laminated body 13 to the liquid crystal panel 5.

Furthermore, in the liquid crystal display apparatus 1 to which the present invention is applied, since respective light adjustment patterns 18 are formed at the light diffusion plate 15 in the state positioned immediately above portions respectively facing the respective LEDs 12, it is possible to reflect direct incident component of rays of display light by respective light adjustment patterns 18. Thus, occurrence of the high luminance region can be reduced. The respective light adjustment patterns 18 are formed so as to take longitudinal elliptical shape which is slightly larger than the outer shape of LED 12 and is longitudinally elongated to reduce occurrence of stripe shaped high luminance region where rays of display light which have been emitted from respective LEDs 12 toward the outer circumferential direction are converged into portions between respective light source element arrays 11$a$ to 11$d$.

In addition, the liquid crystal display apparatus 1 to which the present invention is applied can absorb positional shifts between respective light adjustment patterns 18 and the respective LEDs 12 also with respect to dimensional changes resulting from thermal change, parts accuracy and/or assembling accuracy.

In the liquid crystal display apparatus 1 to which the present invention is applied, rays of display light of high capacity which have been emitted from respective LEDs 12 are efficiently guided to the liquid crystal panel 5, and rays of display light caused to be uniform over the entire surface are emitted from the light diffusion plate 15. Thus, in the liquid crystal panel 5, there is performed display of high luminance and high accuracy in which occurrence of color unevenness, ramp image and/or lateral stripe has been prevented.

It is to be noted that while the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

The invention claimed is:

1. A backlight device comprising:
a light diffusion plate disposed between a transmission type display panel and a light source unit in which plural light source blocks, where a large number of light emitting diodes are mounted, are arranged with a predetermined spacing therebetween, and adapted to allow a portion of rays of display light which have been emitted from respective light emitting diodes to be transmitted therethrough, and to allow the other portion thereof to be reflected thereon to deliver the rays of display light thus obtained to the transmission type display panel in a uniform state from an entire surface thereof,
wherein the light diffusion plate is formed by resin material having light transmission characteristics, and is adapted so that light adjustment patterns are formed within respective regions facing respective light emitting diodes of plane surfaces opposite to the light source blocks to reflect the rays of display light, the light adjustment patterns being formed by attaching light reflection ink, wherein the light reflection ink comprises a light reflection ink material comprising a light shielding agent and a diffusion agent, and
wherein respective light adjustment patterns are formed to correspond to the respective light emitting diodes, each of the respective light emitting diodes having a diameter D, and wherein a first length $W_1$ corresponding to the major axis of each of the respective light adjustment patterns is 1 mm to 2 mm larger than D, and wherein a second length $W_2$ of each of the respective light adjustment patterns, the second length $W_2$ corresponding to a second axis perpendicular to the first axis, is 2 mm to 4 mm larger than $W_1$.

2. The backlight device as set forth in claim 1,
wherein the respective light adjustment patterns are gradation patterns each constituted by a large number of light adjustment dots, these light adjustment dots being formed such that a light transmission factor of rays of display light is caused to gradually increase from a central region toward a peripheral region.

3. A transmission type liquid crystal display apparatus comprising:
a transmission type liquid crystal panel;

a light source unit in which plural light source blocks, where a large number of light emitting diodes are mounted, are arranged with a predetermined spacing therebetween, the light source unit being adapted for delivering, from a rear face side of the liquid crystal panel, rays of display light which have been emitted from respective light emitting diodes;

an optical functional sheet laminated body in which plural functional optical sheets are laminated, and adapted for suitably converting the rays of display light to guide the rays of display light thus obtained to the transmission type liquid crystal panel;

a diffusion light guide plate for diffusing, therewithin, the rays of display light which have been incident from one surface side to deliver the rays of display light thus diffused from the other surface side to the optical functional sheet laminated body;

a light diffusion plate oppositely disposed with a predetermined spacing with respect to the diffusion light guide plate, and adapted for allowing a portion of the rays of display light to be transmitted therethrough and to allow another portion thereof to be reflected thereon to deliver the rays of display light thus obtained to the diffusion light guide plate in a uniform state from an entire surface thereof; and a reflection sheet oppositely disposed with a predetermined spacing with respect to the light diffusion plate at a rear face side of the light source unit, and adapted for allowing the rays of display light which have been emitted in an outer circumferential direction from the respective light emitting diodes and the rays of display light which have been reflected on the light diffusion plate to be reflected toward the light diffusion plate side;

wherein the light diffusion plate is formed by resin material having light transmission characteristics, and is adapted so that light adjustment patterns are formed within respective regions facing the respective light emitting diodes of plane surfaces opposite to the light source blocks to reflect the rays of display light, the light adjustment patterns being formed by attaching light reflection ink, wherein the light reflection ink comprises a light reflection ink material comprising a light shielding agent and a diffusion agent, and wherein respective light adjustment patterns are formed to correspond to the respective light emitting diodes, each of the respective light emitting diodes having a diameter D, and wherein a first length $W_1$ corresponding to the major axis of each of the respective light adjustment patterns is 1 mm to 2 mm larger than D, and wherein a second length $W_2$ of each of the respective light adjustment patterns, the second length $W_2$ corresponding to a second axis perpendicular to the first axis, is 2 mm to 4 mm larger than $W_1$.

4. The transmission type liquid crystal display apparatus as set forth in claim 3, wherein the respective light adjustment patterns are gradation patterns each constituted by a large number of light adjustment dots, these light adjustment dots being formed so that a light transmission factor of rays of display light is caused to gradually increase from a central region toward a peripheral region.

5. A light diffusion member having light transmission characteristics, the light diffusion member comprising:

a plurality of light adjustment patterns formed by light reflection ink, wherein the light reflection ink comprises a light reflection ink material comprising a light shielding agent and a diffusion agent, wherein respective light adjustment patterns are formed to correspond to respective light emitting diodes, each of the respective light emitting diodes having a diameter D, and wherein a first length $W_1$ of each of the respective light adjustment patterns is 1 mm to 2 mm larger than D, and wherein a second length $W_2$ of each of the respective light adjustment patterns, the second length $W_2$ being perpendicular to the first length $W_1$, is 2 mm to 4 mm larger than $W_1$.

6. The light diffusion member as set forth in claim 5, wherein the plurality of light adjustment patterns include gradation patterns each comprising a large number of light adjustment dots, these light adjustment dots being formed such that a light transmission factor gradually increases from a central region toward a peripheral region.

7. The light diffusion member as set forth in claim 5, wherein the light shielding agent and the diffusion agent are mixed at a predetermined ratio.

8. The light diffusion member as set forth in claim 5, wherein each of the light adjustment patterns is formed in an elliptical shape, rectangular shape and/or polygonal shape.

9. The light diffusion member as set forth in claim 5, wherein the light adjustment patterns are in a matrix form.

* * * * *